US008526055B1

(12) United States Patent
Ray (10) Patent No.: US 8,526,055 B1
(45) Date of Patent: Sep. 3, 2013

(54) STANDARDIZED TEST AND SURVEY IMAGING SYSTEM

(75) Inventor: Damon E. Ray, New Hope, MN (US)

(73) Assignee: Data Recognition Corporation, Maple Grove, MN (US)

( * ) Notice: Subject to any disclaimer, the term of this patent is extended or adjusted under 35 U.S.C. 154(b) by 947 days.

(21) Appl. No.: 12/256,354

(22) Filed: Oct. 22, 2008

Related U.S. Application Data (60) Provisional application No. 60/981,757, filed on Oct. 22, 2007.

(51) Int. Cl.
*H04N 1/40* (2006.01)

(52) U.S. Cl.
USPC ............................................ 358/1.9; 358/468

(58) Field of Classification Search
USPC .................... 358/1.9, 2.1, 474, 468; 382/183
See application file for complete search history.

(56) References Cited

U.S. PATENT DOCUMENTS

| | | | |
|---|---|---|---|
| 4,813,077 A | 3/1989 | Woods et al. | |
| 4,817,179 A | 3/1989 | Buck | |
| 4,827,330 A | 5/1989 | Walsh et al. | |
| 4,837,842 A | 6/1989 | Holt | |
| 4,967,354 A | 10/1990 | Buchanan | |
| 4,978,305 A | 12/1990 | Kraft | |
| 5,001,769 A | 3/1991 | Reid-Green et al. | |
| 5,004,896 A | 4/1991 | Serrell et al. | |
| 5,041,874 A | 8/1991 | Nishimori et al. | |
| 5,194,966 A | 3/1993 | Quardt et al. | |
| 5,313,291 A | 5/1994 | Appel et al. | |
| 5,321,611 A | 6/1994 | Clark et al. | |
| 5,363,318 A | 11/1994 | McCauley | |
| 5,433,615 A | 7/1995 | Clark | |
| 5,452,379 A | 9/1995 | Poor | |
| 5,557,515 A | 9/1996 | Abbruzzese et al. | |
| 5,672,060 A | 9/1997 | Poor | |
| 5,735,694 A | 4/1998 | Clark et al. | |
| 5,825,947 A | 10/1998 | Sasaki et al. | |
| 5,832,100 A | 11/1998 | Lawton et al. | |
| 5,907,742 A | 5/1999 | Johnson et al. | |
| 5,987,149 A | 11/1999 | Poor | |
| 5,987,302 A | 11/1999 | Driscoll et al. | |
| 6,141,120 A | 10/2000 | Falk | |

(Continued)

FOREIGN PATENT DOCUMENTS

EP 0 374 892 B1 4/1997

OTHER PUBLICATIONS

""Score Image" Processing of Constructed-Responses, Essays, and Writing Samples", *UNISCORE, Incorporated*, (1992), 3 pgs.

(Continued)

*Primary Examiner* — Thomas D Lee
*Assistant Examiner* — Stephen M Brinich
(74) *Attorney, Agent, or Firm* — Schwegman, Lundberg & Woessner, P.A.

(57) ABSTRACT

Disclosed herein, among other things, is an imaging system for processing educational assessments. According to one embodiment of the present subject matter, educational assessments are received in a paper format and processed from the paper format to an electronic format. A navigation console is provided and adapted to provide a portal and a login interface to a user. Educational assessment documents are scanned and images are generated. The images are passed through applications to derive data from the images, and the data is transferred to peripheral systems, according to various embodiments.

20 Claims, 8 Drawing Sheets

(56) References Cited

U.S. PATENT DOCUMENTS

| | | |
|---|---|---|
| 6,173,154 B1 | 1/2001 | Kucinski et al. |
| 6,183,261 B1 | 2/2001 | Clark et al. |
| 6,204,873 B1 | 3/2001 | Shimazaki |
| 6,256,111 B1 | 7/2001 | Rijavec |
| 6,321,052 B1 | 11/2001 | Yamashina et al. |
| 6,366,759 B1 | 4/2002 | Burstein et al. |
| 6,404,517 B1 | 6/2002 | Chao |
| 6,459,509 B1 | 10/2002 | Maciey et al. |
| 6,471,352 B2 | 10/2002 | Akahira |
| 6,526,258 B2 | 2/2003 | Bejar et al. |
| 6,532,026 B2 | 3/2003 | Takahashi et al. |
| 6,645,029 B2 | 11/2003 | Akahira |
| 6,714,321 B2 | 3/2004 | Rao et al. |
| 6,832,825 B1 | 12/2004 | Nishikori et al. |
| 6,947,571 B1 | 9/2005 | Rhoads et al. |
| 7,027,187 B1 | 4/2006 | Zuber |
| 7,084,998 B2 | 8/2006 | Blair et al. |
| 7,162,198 B2 | 1/2007 | Kuntz et al. |
| 7,295,340 B2 | 11/2007 | Mestha et al. |
| 7,406,392 B2 | 7/2008 | Gedlinske et al. |
| 7,411,688 B1 | 8/2008 | Zhai et al. |
| 7,474,783 B2 | 1/2009 | Sharma et al. |
| 7,505,173 B2 | 3/2009 | Viturro et al. |
| 7,516,895 B2 | 4/2009 | Holoubek |
| 7,573,616 B2 * | 8/2009 | Poor ............................ 358/474 |
| 7,630,931 B1 | 12/2009 | Rachev et al. |
| 7,692,832 B2 | 4/2010 | Klassen |
| 7,697,166 B2 | 4/2010 | Bray |
| 7,742,991 B2 | 6/2010 | Salzmann et al. |
| 7,831,195 B2 | 11/2010 | Borchers |
| 7,835,043 B2 | 11/2010 | Gila et al. |
| 7,992,953 B2 | 8/2011 | Yorimoto et al. |
| 8,102,412 B2 | 1/2012 | Klemer et al. |
| 2001/0028916 A1 | 10/2001 | Akahira |
| 2001/0040979 A1 | 11/2001 | Davidson et al. |
| 2002/0054384 A1 | 5/2002 | Motamed |
| 2002/0126172 A1 | 9/2002 | Akiyama |
| 2002/0161772 A1 | 10/2002 | Bergelson et al. |
| 2003/0016263 A1 | 1/2003 | Takahashi et al. |
| 2003/0105721 A1 | 6/2003 | Ginter et al. |
| 2003/0118976 A1 | 6/2003 | Makishima et al. |
| 2003/0126001 A1 | 7/2003 | Northcutt et al. |
| 2003/0202029 A1 | 10/2003 | Bronswijk et al. |
| 2004/0117617 A1 | 6/2004 | Geller et al. |
| 2004/0130739 A1 | 7/2004 | Adam et al. |
| 2004/0131279 A1 | 7/2004 | Poor |
| 2004/0264771 A1 | 12/2004 | Sharma et al. |
| 2005/0024410 A1 | 2/2005 | Subirada et al. |
| 2005/0094170 A1 | 5/2005 | Ichitani |
| 2005/0172226 A1 | 8/2005 | Kobashi et al. |
| 2005/0206982 A1 | 9/2005 | Hattori |
| 2005/0213790 A1 | 9/2005 | Rhoads et al. |
| 2006/0077407 A1 | 4/2006 | Tanaka |
| 2006/0164700 A1 | 7/2006 | Hayashi |
| 2006/0193017 A1 | 8/2006 | Zuber |
| 2006/0195508 A1 | 8/2006 | Bernardin et al. |
| 2006/0227386 A1 | 10/2006 | Nuuja et al. |
| 2006/0288279 A1 | 12/2006 | Yacoub et al. |
| 2007/0024928 A1 | 2/2007 | Ono |
| 2007/0201112 A1 | 8/2007 | Motamed |
| 2008/0080027 A1 | 4/2008 | Mestha et al. |
| 2008/0152371 A1 | 6/2008 | Burry et al. |
| 2008/0225067 A1 | 9/2008 | Morino et al. |
| 2008/0316552 A1 | 12/2008 | Poor |
| 2009/0059321 A1 | 3/2009 | Buckley et al. |
| 2009/0086230 A1 | 4/2009 | Reed |
| 2010/0231728 A1 | 9/2010 | Holub |
| 2010/0284041 A1 | 11/2010 | Warnes |

OTHER PUBLICATIONS

"Image Processing of Open-Ended Questions", *UNISCORE, Incorporated*, (1992), 4 pgs.

Cason, Gerald J, et al., "Integrated Test Scoring, Performance Rating and Assessment Records Keeping", *Innovations in Medical Education, Association of American Medical Colleges*, Washington, D.C., Paper presented at the annual meeting of the Association of Medical Colleges., (Nov. 1, 1987), 2-20.

Gathy, P, et al., "Computer-Assisted Self-Assessment (CASA) in Histology", *Computers Education.*, vol. 17, No. 2., (1991), 109-116.

Reid-Green, Keith S, "A High Speed Image Processing System [Journal Paper]", *IMC Journal*, vol. 26, No. 2, Mar.-Apr., USA, (1990), 12-14.

Zuckerman, Ronald A, "Optical Scanning for Data Collection, Conversion & Reduction", *NTIS, U.S. Department of Commerce, National Technical Information Service*, August, Springfield, VA, USA, (1967), 49 pgs.

"U.S. Appl. No. 12/256,303, Response filed Oct. 24, 2011 to Restriction Requirement mailed Jul. 23, 2011", 6 pgs.

"U.S. Appl. No. 12/256,303, Restriction Requirement mailed Aug. 23, 2011", 5 pgs.

"U.S. Appl. No. 12/256,317, Non Final Office Action mailed Oct. 7, 2011", 10 pgs.

"U.S. Appl. No. 12/256,282, Non Final Office Action mailed Jan. 4, 2012", 12 pgs.

"U.S. Appl. No. 12/256,282, Response filed Apr. 4, 2012 to Non Final Office Action mailed Jan. 4, 2012", 7 pgs.

"U.S. Appl. No. 12/256,303, Final Office Action mailed May 29, 2012", 15 pgs.

"U.S. Appl. No. 12/256,303, Non Final Office Action Mailed Jan. 5, 2012", 9 pgs.

"U.S. Appl. No. 12/256,303, Response filed Apr. 5, 2012 to Non Final Office Action mailed Jan. 5, 2012", 8 pgs.

"U.S. Appl. No. 12/256,317 , Response filed Feb. 7, 2012 to Non Final Office Action mailed Oct. 7, 2011", 8 pgs.

"U.S. Appl. No. 12/256,317, Notice of Allowance mailed Mar. 2, 2012", 11 pgs.

"U.S. Appl. No. 12/256,339, Non Final Office Action mailed Jan. 10, 2012", 13pgs.

"U.S. Appl. No. 12/256,339, Response filed Apr. 10, 2012 to Non Final Office Action mailed Jan. 10, 2012", 7 pgs.

"U.S. Appl. No. 12/256,282, Advisory Action mailed Dec. 31, 2012", 3 pgs.

"U.S. Appl. No. 12/256,282, Response filed Dec. 5, 2012 to Final Office Action mailed Aug. 6, 2012", 7 pgs.

"U.S. Appl. No. 12/256,303, Response filed Oct. 22, 2012 to Final Office Action mailed May 29, 2012", 10 pgs.

"U.S. Appl. No. 12/256,317, Notice of Allowance mailed Nov. 7, 2012", 9 pgs.

"U.S. Appl. No. 12/256,339 , Response filed Nov. 15, 2012 to Final Office Action mailed Sep. 7, 2012", 9 pgs.

"U.S. Appl. No. 12/256,339, Examiner Interview Summary mailed Nov. 23, 2012", 3 pgs.

\* cited by examiner

STANDARDIZED TEST AND SURVEY IMAGING SYSTEM

CROSS-REFERENCE TO RELATED APPLICATIONS

This application claims the benefit of provisional U.S. patent application Ser. No. 60/981,757, filed on Oct. 22, 2007, which is hereby incorporated by reference in its entirety.

TECHNICAL FIELD

This disclosure relates generally to method and apparatus for processing scanned documents, and more particularly to a standardized form imaging system.

BACKGROUND

One method for evaluating the knowledge or skill of a person includes the use of standardized tests. For example, standardized tests are used to monitor the academic progress of students. Some standardized tests incorporate objective test questions that are answered by filling in an appropriate oval in an associated bubble-type answer sheet using a pencil. Some standardized tests include open-ended questions or tests. Examples of open-ended questions in these tests include essay questions, fill-in-the-blank questions, fill-in-the-map questions, math questions, and motor skill tests in which a test taker draws geometric shapes. Open-ended questions or tests, also referred to herein as scoring tasks or test items, are evaluated and scored by a human reviewer, also referred to herein as a reader.

Standardized tests are distributed from test processing centers to test-taking centers where the tests are administered to test-takers. One example of a test-taker is a student. Another example of a test-taker is a student who is taking home-based assessments.

Another practice by which information is obtained is a survey. Surveys are used to obtain information from a person, such as a consumer of goods or services. Surveys also use forms having standardized questions. Large amounts of data can be compiled from surveys using standardized forms. Thus, there is a need for accurate collection of data from the standardized forms.

In order to promote the integrity and accuracy of the administered tests and test results, test responses must be accurately scanned, recorded and distributed, so that objective test items can be properly scored by machine and open-ended test items can be properly scored by readers.

Improved standardized test and survey imaging systems are needed.

SUMMARY

The above-mentioned problems and others not expressly discussed herein are addressed by the present subject matter and will be understood by reading and studying this specification.

Disclosed herein, among other things, is an imaging system for processing educational assessments. According to one embodiment of the present subject matter, educational assessments are received in a paper format and processed from the paper format to an electronic format. A navigation console is provided and adapted to provide a portal and a login interface to a user. Educational assessment documents are scanned and images are generated. The images are passed through applications to derive data from the images, the applications including: a scan facilitator application, an image quality application, a scan quality application, a scan quality exporter application, an image mark recognition scoring engine application, a barcode edit application, an editing application, an editing quality control application, a validate application, and an instance build application. Data is transferred to peripheral systems, according to various embodiments.

Disclosed herein, among other things, are method and apparatus for image insertion in standardized test imaging. According to one embodiment of the present subject matter, a plurality of educational assessment documents are scanned as part of a high-volume batch processing scanning system. A page of a document that is not successfully scanned by the batch processing scanning system is electronically tracked, and the page is sent for manual scanning. The document is prevented from being further processed while awaiting manual scanning. According to one embodiment, the manually scanned page is placed with the document using electronic tracking.

Also discussed herein, among other things, is a system for scan quality in standardized test imaging. According to one embodiment of the present subject matter, a plurality of educational assessment documents are scanned as part of a high-volume batch processing scanning system. Scanner errors are electronically identified, and scanner read errors, page identification errors, and batch data errors are electronically resolved. According to one embodiment, the system includes certifying that no image related errors remain in the batch.

This Summary is an overview of some of the teachings of the present application and not intended to be an exclusive or exhaustive treatment of the present subject matter. Further details about the present subject matter are found in the detailed description and appended claims. The scope of the present invention is defined by the appended claims and their legal equivalents.

DETAILED DESCRIPTION

The following detailed description of the present subject matter refers to subject matter in the accompanying drawings which show, by way of illustration, specific aspects and embodiments in which the present subject matter may be practiced. These embodiments are described in sufficient detail to enable those skilled in the art to practice the present subject matter. References to "an", "one", or "various" embodiments in this disclosure are not necessarily to the same embodiment, and such references contemplate more than one embodiment. The following detailed description is demonstrative and not to be taken in a limiting sense. The scope of the present subject matter is defined by the appended claims, along with the full scope of legal equivalents to which such claims are entitled.

The present subject matter generally to method and apparatus for processing scanned documents, and more particularly to a standardized test imaging system. An imaging system includes a plurality of applications dedicated to processing answer sheets (or pages) from standardized tests or surveys, so that the response to each question (or item) can be properly tracked, scored and reported. The purpose of the system is to convert education assessments (standardized tests, surveys, etc.) from paper format to electronic format, thereby providing a means to score both objective (bubbled) fields and writing responses. In addition to scoring fields, the system associates students to their scanned data and achieves a high level of quality in scanned results. Documents are received and scanned, and images are generated and passed through processes and applications before data is handed off to peripheral systems.

According to various embodiments, bubbles refer to any two-dimensionally closed form adapted to be filled in with a writing utensil, such as but not limited to: a circle, an ellipse, a square, and a rectangle. Bubbles with other shapes and sizes can be used without departing from the scope of this disclosure.

Figure 1A:
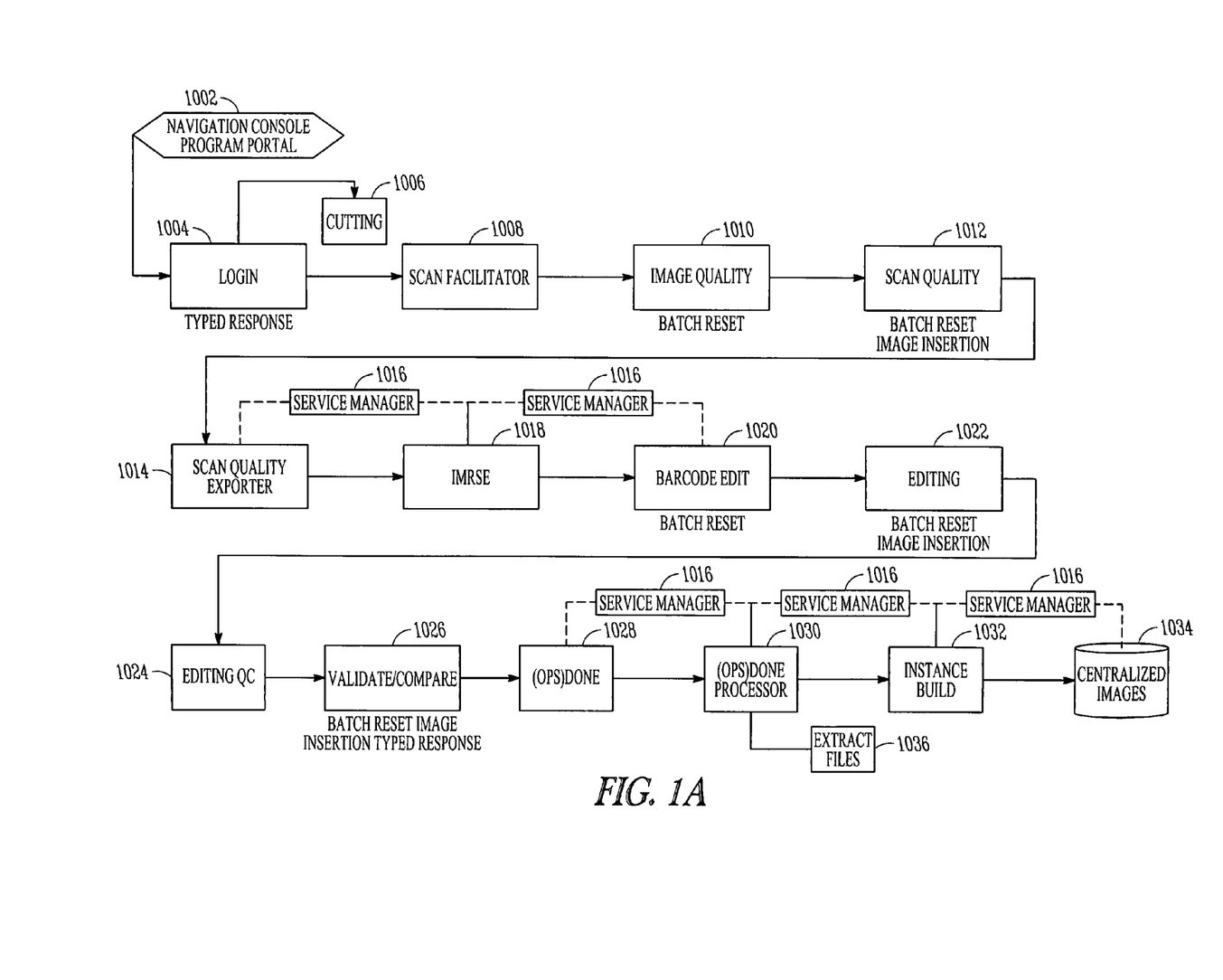
FIG. 1A illustrates a flow diagram of an embodiment of an imaging system.

FIG. 1A illustrates a flow diagram of an embodiment of an imaging system for processing educational assessments. According to one embodiment of the present subject matter, educational assessments are received in a paper format and processed from the paper format to an electronic format. A navigation console 1002 is provided and adapted to provide a portal and a login 1004 interface to a user. A cutting 1006 application is used by the login application in an embodiment. Educational assessment documents are scanned and images are generated. The images are passed through applications to derive data from the images, the applications including: a scan facilitator application 1008, an image quality application 1010, a scan quality application 1012, a scan quality exporter application 1014, an image mark recognition scoring engine application 1018, a barcode edit application 1020, an editing application 1022, an editing quality control application 1024, a validate application 1026, an operations done application 1028, an operations done processor application 1030, and/or an instance build application 1032. Data is transferred to peripheral systems, according to various embodiments. Centralized images are stored in a database 1034, and files are extracted at 1036. Extracted files include enhanced, XML gateway and/or XML format, in various embodiments. A service manager application 1016 is used, in an embodiment.

Figure 1B:
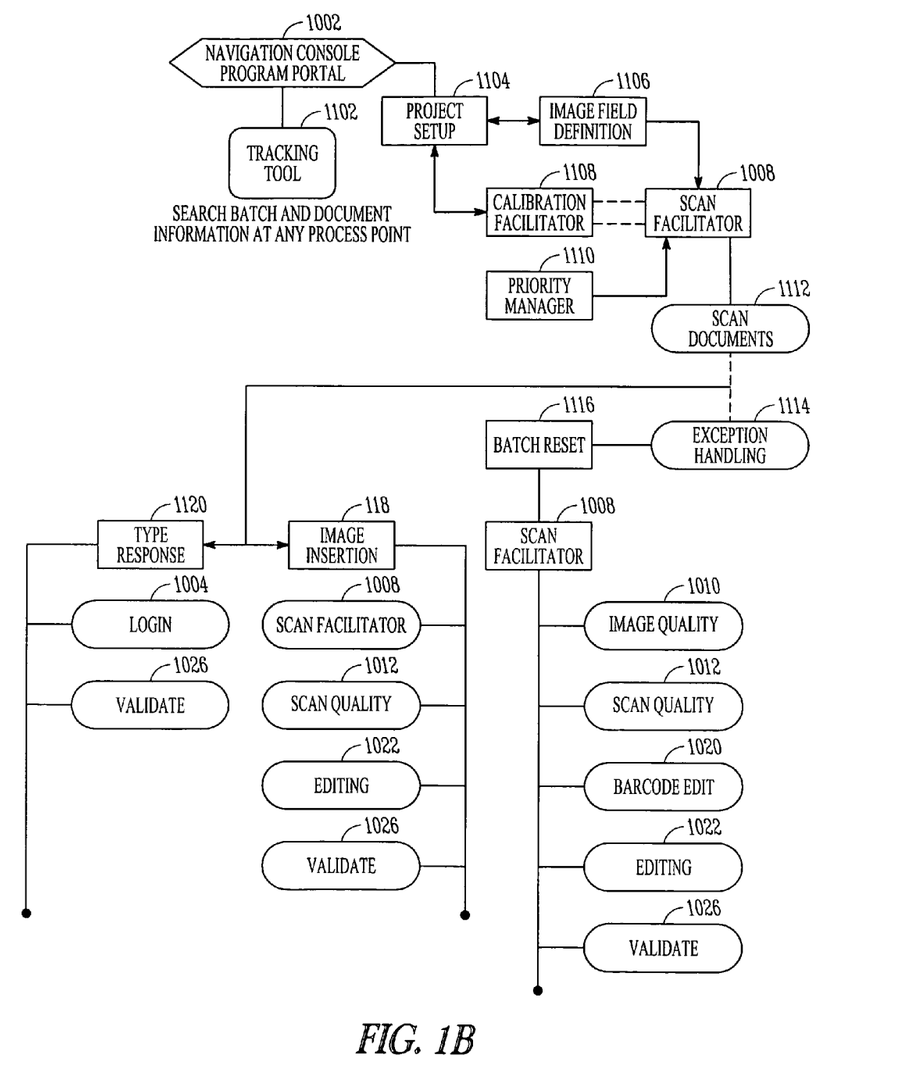
FIG. 1B illustrates a flow diagram of an embodiment of support applications for an imaging system.

According to various embodiments, processing education assessments further includes providing support applications for managing the processing. FIG. 1B illustrates a flow diagram of an embodiment of support applications for an imaging system. Support applications include, but are not limited to: a project setup application 1104, an image field definition application 1106, a calibration facilitator application 1108, and a priority manager application 1110. In various embodiments, support applications include a tracking tool application 1102, a batch reset application 1116, an image insertion application 1118, and a typed response application 1120. The support applications are used in scanning documents 1112 and handling errors or exceptions 1114. According to various embodiments, education assessments include standardized test answer sheets and/or survey response forms. The validate application, which validates data associated with the image, includes a compare application, in various embodiments. In one embodiment, passing images through applications includes using a batch reset application if data fails to validate. The assessments are scanned using an IBML scanner, in an embodiment.

Figure 3:
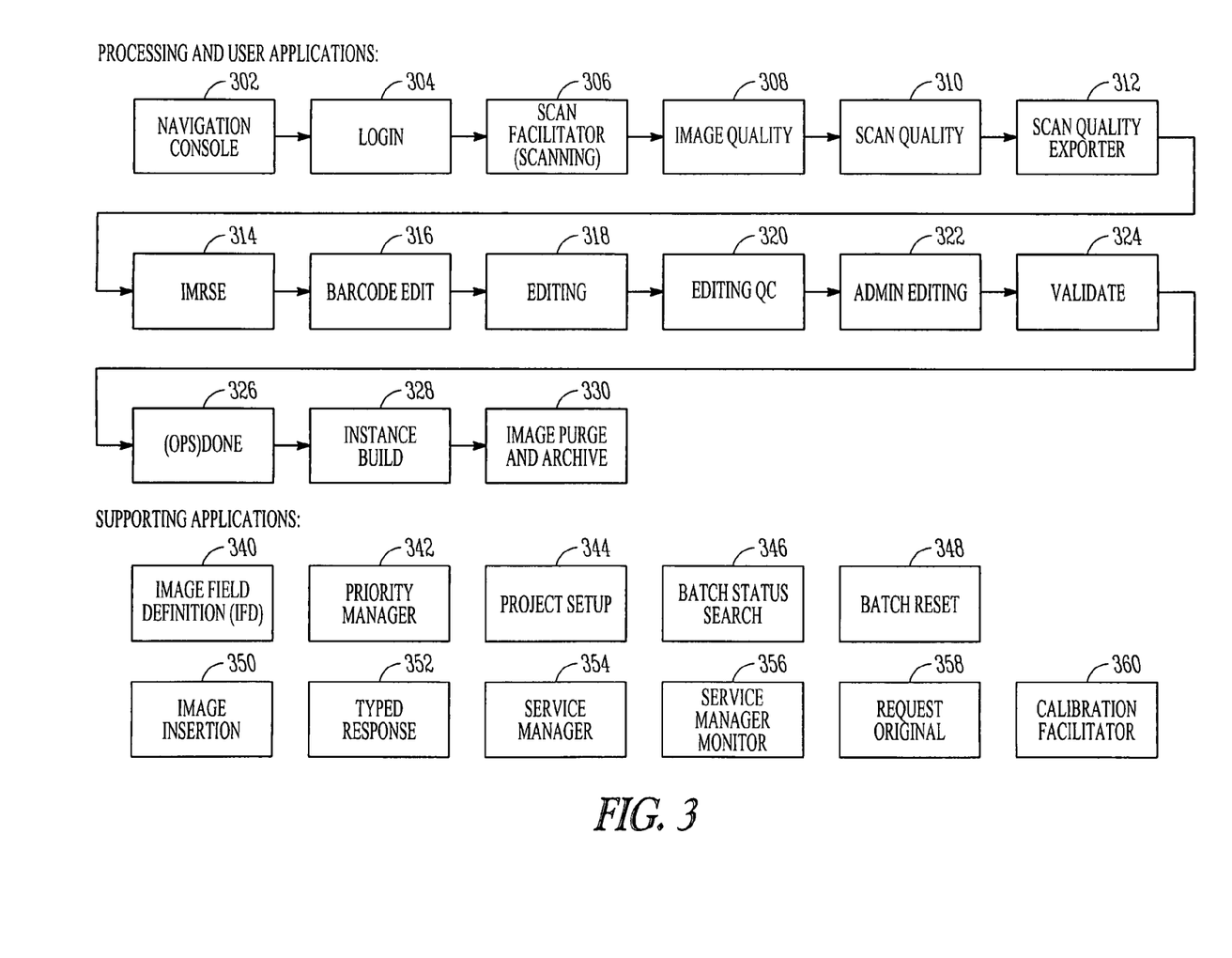
FIG. 3 illustrates a block diagram of an embodiment of an apparatus for imaging documents.

FIG. 3 illustrates a block diagram of an embodiment of an apparatus for imaging documents. Processing and user applications in the depicted embodiment include applications for: navigation console 302, login 304, scan facilitator 306, image quality 308, scan quality 310, scan quality exporter 312, image mark scoring recognition engine (IMRSE) 314, barcode edit 316, editing 318, editing quality control (QC) 320, administrative editing 322, validate 324, operations (OPS) done 326, instance build 328, and image purge and archive 330. Supporting applications include: image field definition (IFD) 340, priority manager 342, project setup 344, batch status search 346, batch reset 348, image insertion 350, typed response 352, service manager 354, service manager monitor 356, request original 358 and calibration facilitator 360. The imaging system applications include, but are not limited to: (1) image insertion, including typed response, (2) scan quality, (3) login, (4) scan facilitator, (5) barcode edit, (6) validate, (7) batch status search, (8) batch reset, (9) project setup, (10) navigation console.

The image insertion application identifies pages that cannot be scanned, or are improperly scanned, and flags them for manual re-scanning. The pages are electronically tracked so they can be inserted back with their assigned document. The insertion is done electronically, in one embodiment. If separate typewritten response pages (for open-ended questions) exist, they are also electronically tracked and associated with an item using a table in a database.

Figure 2A:
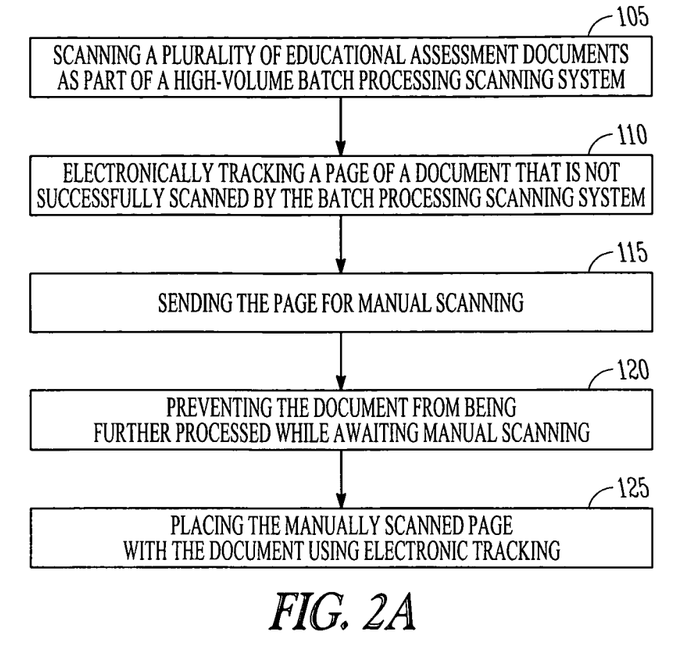
FIG. 2A illustrates a flow diagram of an embodiment of a method for image insertion in standardized test imaging.

FIG. 2A illustrates a flow diagram of an embodiment of a method for image insertion in standardized test imaging. According to one embodiment of the method, a plurality of educational assessment documents are scanned as part of a high-volume batch processing scanning system, at 105. A page of a document that is not successfully scanned by the batch processing scanning system is electronically tracked, at 110, and the page is sent for manual scanning, at 115. The document is prevented from being further processed while awaiting manual scanning, at 120. According to one embodiment, the manually scanned page is placed with the document using electronic tracking, at 125.

According to various embodiments, the method also includes electronically tracking separate typewritten response pages. Tracking includes associating with an item using a table in a database, in one embodiment. Preventing the document from being further processed includes using the validate application, in an embodiment.

The scan quality application provides the capability to correct data and other image related errors that occur through image scanning, assuring data integrity of scanned results. In one embodiment, the scan quality application works with IBML scanners. The application verifies project identification and codes entered by a user before proceeding. The application can flip or rotate pages as needed to correct scanning errors, so that errors in scanning can be corrected without rescanning the document or documents. In one embodiment, each batch of scanned data is taken through five steps prior to certification. Any issue found in a step is resolved before the batch moves to the next step. The application is user interactive and allows corrective data entry, which is stored and maintained though processing. Corrective measures include: identifying missing images or miscollated pages, resolution of scanner read errors, resolution of page identification errors, batch data error resolution and certification. More than one project can be run simultaneously on the application and more than one instance of the application can be run at a time. Scanned images as well as data are available for viewing in the application, in one embodiment.

Figure 2B:
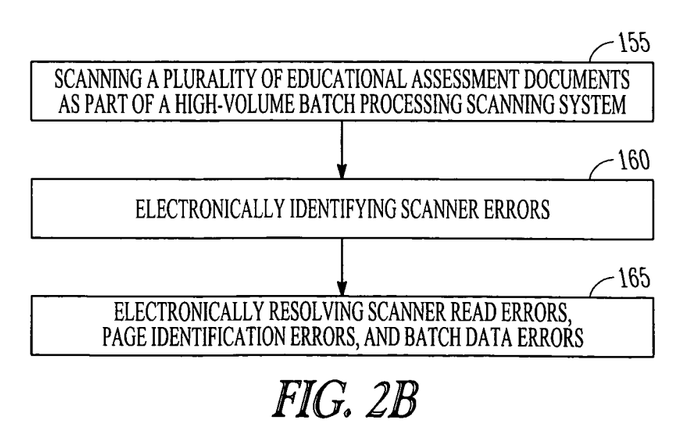
FIG. 2B illustrates a flow diagram of an embodiment of a method for scan quality in standardized test imaging.

FIG. 2B illustrates a flow diagram of an embodiment of a method for scan quality in standardized test imaging. According to one embodiment of the method, a plurality of educational assessment documents are scanned as part of a high-volume batch processing scanning system, at 155. Scanner errors are electronically identified, at 160, and scanner read errors, page identification errors, and batch data errors are electronically resolved, at 165. According to one embodiment, the method includes certifying that no image related errors remain in the batch.

According to various embodiments, identifying scanner errors includes identifying missing images. Identifying scanner errors includes identifying improperly collated pages, for example. Electronically resolving includes electronically resolving without rescanning documents, according to various embodiments.

The project setup application includes a GUI (graphic user interface) to set up project specific data, in one embodiment. The batch status search application allows a user to search for a batch and the status of the batch in the imaging system. The login application includes applications for entering a batch into the imaging system, including entering information about the batch including the number of documents and items. The scan facilitator application includes a GUI interface with the scanner. The barcode edit application includes an interface to correct barcode misreads. The validate application includes a check to determine whether data is consistent with login, to make sure what is processed is what is being entered into the system. The batch reset application allows for re-running a batch through an intermediate process without having to rescan the entire batch. The navigation console application is an application that controls all other applications in the imaging system, in various embodiments.

The image field definition (IFD) application is used to identify the location of bubbles (for objective test question responses) and constructed (or open-ended) response items in test booklets. This defines fields the scorers (both human and machine) will receive. This application is also used to set editing rules for each project, and convert vector images (such as PDF) into raster images (such as TIFF) format for used in an imaging system.

Figure 5:
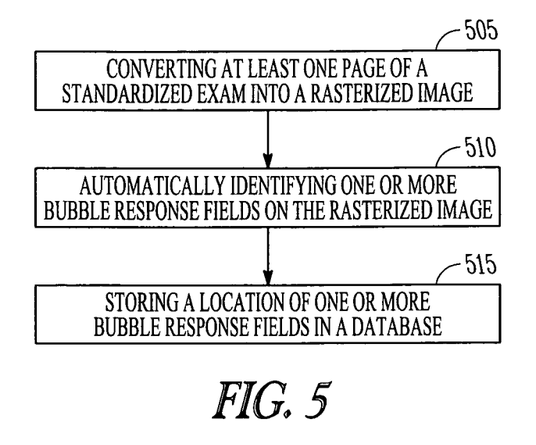
FIG. 5 illustrates a flow diagram of an embodiment of a method for identifying fields for scanned documents.

FIG. 5 illustrates a flow diagram of an embodiment of a method for identifying fields for scanned documents. According to an embodiment of a method, at least one page of a standardized exam is converted into a raster image, at 505. At 510, one or more bubble response fields are automatically identified on the raster image. At 515, a location of one or more bubble response fields is stored in a database.

Bubble response fields are automatically identified using a search algorithm. A search is performed to identify a predefined shape (bubble). A first location is searched, and if unsuccessful, another location adjacent the first location (by a predefined number of pixels) is searched. According to various embodiments, a user defines parameters used in the search. According to various embodiments, a portion of the raster image is defined that includes one or more bubble response fields. A size of the bubbles of the one or more bubble response fields is selected, and one or more bubbles of the size selected are automatically detected. A position of each bubble detected is determined and stored, according to various embodiments. In various embodiments, types of raster images include TIFF and JPEG image. Automatically converting at least one page of a standardized exam into a raster image includes converting the page from a PDF image into a raster image, in an embodiment. In one embodiment, converting into a raster image includes converting from a color image into a black and white image. The method further includes providing directions to locate one or more bubbles associated with a response for a particular question, in an embodiment. In various embodiments, the automatically identifying includes providing for a user input to define a number of bubbles within a bubble response field, automatically detecting one or more bubbles within the bubble response field, and verifying that the number of bubbles detected is equal to the number of bubbles defined. If the number detected is not equal to the number defined by the user, the user can either manually find the bubbles by tracing them in an embodiment, or can redraw the second box and allow the system another attempt to automatically find the bubbles as described. The process can then be repeated as necessary. The coordinates of the bubbles found are stored in a database. According to various embodiments, the coordinates of the bubbles are referenced from marks placed at predetermined locations on an image, such as "T" marks.

The priority manager application is a preliminary or "setup" application to the main scanning application, and defines process priorities based on priority ranking of material and return type that has different priorities than the order of scanning (processing math questions first, for example). The priority manager application defines batches, documents and items based on priorities in real time. Providing a preliminary priority management tool provides readers and graders with information in the proper sequence. For each batch, the priority manager looks at the priority of each document within a batch, and assigns to the batch the priority of the highest priority document in the batch, in an embodiment. A document can be a test answer book, in an embodiment.

Figure 6A:
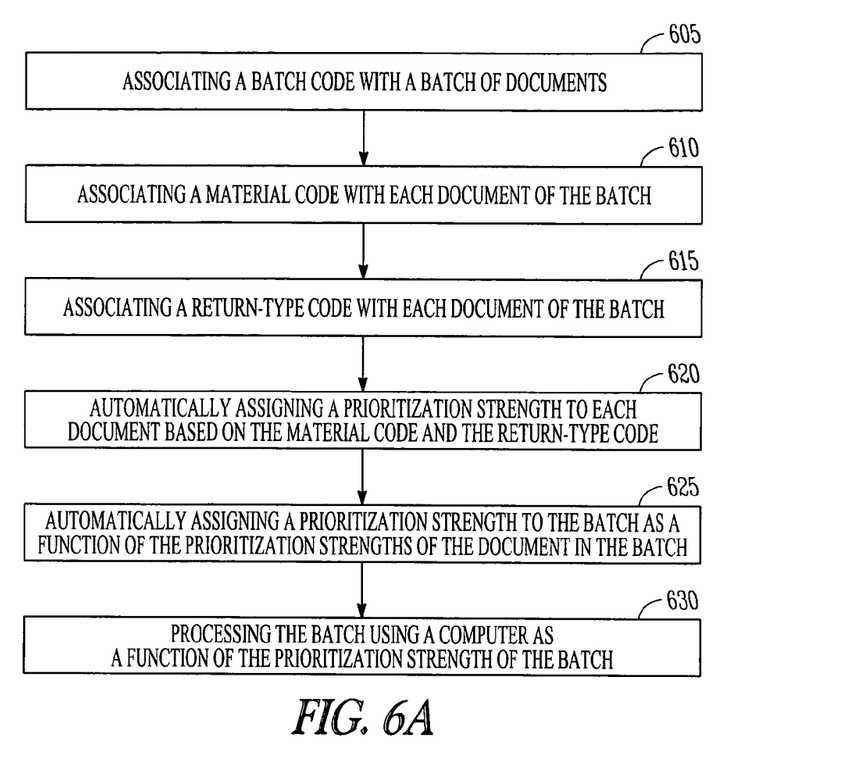
FIG. 6A illustrates a flow diagram of an embodiment of a method for managing priority in standardized test imaging.

FIG. 6A illustrates a flow diagram of an embodiment of a method for managing priority in standardized test and survey imaging. According to an embodiment, a batch code is associated with a batch of documents, at 605, and a material code, at 610, and a return-type code, at 615, are associated with each document of the batch. At 620, a prioritization strength is automatically assigned to each document based on the material code and the return-type code, and at 625, a prioritization strength is automatically assigned to the batch as a function of the prioritization strengths of the documents in the batch. The batch is processed using a computer, as a function of the prioritization strength of the batch, at 630.

According to various embodiments, each batch includes a date code, and batches of equal prioritization are processed by the date code associated with the batch. Processing the batch as a function of the prioritization strength includes storing information present in the batch of documents, retrieving the information using the prioritization strength, and providing the information to one or more graders, in various embodiments. In one embodiment, the method further includes storing and/or retrieving information from a computer memory. In various embodiments, graphical interface is provided for monitoring prioritization and/or status of each batch throughout a process, including a depiction of priority and/or status of each batch in the process.

According to various embodiments, the batch code is read from a bar code located on a header sheet. The material code relates to the grade and subject matter of that document, and is read from each document, in an embodiment. The return-type code is defined by a separate shipping and receiving system, in an embodiment. Various embodiments of the present subject matter permit a user to change the return-type code using a graphical interface.

The priority manager application prioritizes different types of materials going through the imaging system. Material can be categorized as regular return and/or early return (return types). If a material is categorized as both a regular return booklet and an early return booklet, it is recognized by the priority manager as having multiple material/return types. A user of the imaging system can rank all active material/return types against one another for all active projects in the system. The priority manager system allows a user to set up groups of material/return types for processing, as multiple materials can have the same processing requirements. The user can then adjust the rank of each group to be higher, lower or equal to other groups/batches in the system. In addition, the priority manager system allows for material/return types to be allocated to a straggler group, which is given a high priority. As new material/return types are recognized by the system, they are automatically added to the miscellaneous unassigned group until another categorization is identified by the user.

Figure 6B:
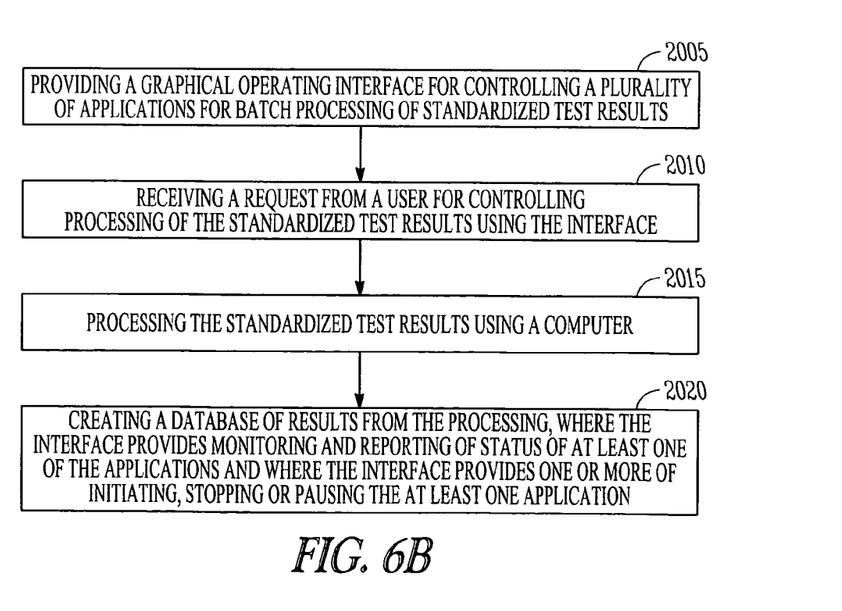
FIG. 6B illustrates a flow diagram of an embodiment of a method for managing batch processing applications.

FIG. 6B illustrates a flow diagram of an embodiment of a method for managing batch processing applications. According to one embodiment of a method, a graphical operating interface is provided for controlling a plurality of applications for batch processing of standardized test results, at 2005. A request from a user is received for controlling processing of the standardized test results using the interface, at 2010. The standardized test results are processed using a computer, at 2015, and a database is created of results from the processing, at 2020. According to various embodiments, the interface provides monitoring and reporting of status of at least one of the applications, and the interface also provides one or more of initiating, stopping or pausing the at least one application.

In one embodiment, the interface is used to select a server from a plurality of servers to perform the processing. The plurality of applications includes a scan quality exporter application, in one embodiment. In various embodiments, the plurality of applications can include an image mark recognition scoring engine (IMRSE) application, an instance build application, a calibration facilitator application, and/or an image purge and archive application.

The system for managing batch processing applications is referred to as a Service Manager application. The Service Manager application retrieves priority information, generated by the Priority Manager application described above, from a database and makes assignments based on the priority. Multiple applications run under the authority of the Service Manager. The Service Manager determines what data should be processed and which available computer resources (machines or servers) should do the processing. The Service Manager has the ability to turn on and off remote machines without having to send a person to the machine location. According to various embodiments, assignments are broken into units and distributed based upon the priority of the assignment, the priority of assignments particular to a machine, and by the total units for each application. Once the application with the greatest units is determined the top unit of assignments is selected for that application based on priority of the assignment and machine. The assignment is then given a machine identification which removes it from the pool of assignments available for distribution. Thus, available assignments for each application are proportional and all types of assignments are equally processed. Each server (or machine) runs the Service Manager application, which pulls assignments from the available ones as needed, updates the status, distributes each assignment to a service application for processing, and further updates the status. If the assignment allocation finds no available assignments, the service sleeps a progressively longer period of time (up to a user definable maximum), and then tries again.

In one embodiment, the Service Manager manages a system for scanning or imaging standardized tests for scoring. In this embodiment, available applications running under the authority of the Service Manager include, but are not limited to: scan quality exporter, image mark recognition and scoring engine (IMRSE), instance build, calibration facilitator and image purge and archive applications.

The Service Manager provides a windows-based interactive system that allows starting, stopping and pausing of the system applications based on authority. In one embodiment, the Service Manager provides a monitoring function, including providing notification that a particular machine or server is not responding. The machine or server includes a blade server, in an embodiment. The Service Manager operates under one authority and with common reporting and behaviors. An assignment is created in a database by the Service Manager. While any given machine can work on any given process, the Service Manager can customize operations, such as isolating one machine to work on one process. The Service Manager is not blade server specific, and can function with any combination of machines or servers. A user can reset a batch from any step to any previous step, in an embodiment.

Various embodiments include a method and apparatus for managing priority and batch processing in standardized test and survey imaging. According to one embodiment of a method, a graphical operating interface is provided for controlling a plurality of applications for batch processing of standardized test results. A request from a user is received for controlling processing of the standardized test results using the interface. The standardized test results are processed using a computer, and a database is created of results from the processing. The interface provides monitoring and reporting of status of the application, and the interface also provides one or more of initiating, stopping or pausing the application. According to various embodiments, creating the database includes associating a batch code with a batch of documents and a material code and a return-type code with each document of the batch, automatically assigning a prioritization strength to each document based on the material code and the return-type code, and processing the batch as a function of the prioritization strength.

According to various embodiments, a prioritization strength is automatically assigned to the batch as a function of the prioritization strength of at least one document in the batch. A prioritization strength is automatically assigned to the batch as a function of the prioritization strength of each document in the batch, in an embodiment. The interface provides resetting a batch from a step in processing to any previous step in processing, according to various embodiments. Each batch includes a date code and batches of equal prioritization strength are processed by date code, in an embodiment.

Throughout the imaging system, which converts educational assessments from paper format to electronic format, one or more background processes run batches and images. The service manager application assigns tasks to available servers, and can run as a windows service on the servers. The service manager pulls assignments from the database and distributes them to the appropriate service application for processing. Each service application updates the status of the assignment upon start and completion, and passes the assignment off to the next application.

A computer application for calibrating imaging equipment is referred to as a calibration facilitator. To ensure quality standards are continually met on scanners, the calibration facilitator application is used to compare baseline calibration decks against scanner output. In an embodiment, IBML scanners are calibrated. However, other types of scanners can be calibrated without departing from the scope of this disclosure.

The calibration facilitator application is a user-based application which serves multiple roles for the calibration environment. It can be used to scan and process calibration decks, review the results of previous calibration scans, import baseline files generated when a calibration deck is scanned on an industry standard calibrated scanner (such as on NCS 5000 scanner, in an embodiment), and perform maintenance of a calibration deck. A calibration deck is a set of printed documents designed for capturing. In an embodiment, one part of the deck includes 16 documents, each having 256 bubbles placed in various patterns. Each of the bubbles is defined to a certain grayscale level, from white to black. In this embodiment, two additional documents in the deck have all 256 white bubbles (used to ensure paper darkness is capturing consistently across the image), and two other documents have 256 black bubbles (used to ensure black captures consistently). This embodiment further includes 30 documents that are identical and have a series of reference marks (or "T" marks) printed at precise distances (both vertically and horizontally) across the form. These are used to make sure the image is capturing at the right speed on the scanner. A threshold is used to compare the scanner to the calibrated industry scanner, and if the scanner is outside tolerances, a maintenance person must service the scanner before continuing. For example, if 3 or 4 marks are blacker than "0" on a hexadecimal scale, then the scanner fails the calibration. The depicted embodiments do not calibrate the scanners, rather check the scanners to ensure they remain in calibration. Using multiple (16 in an embodiment) different sheets with grayscale colors provides better resolution to ensure proper calibration of scanners, and allows results to be depicted more accurately.

Figure 7:
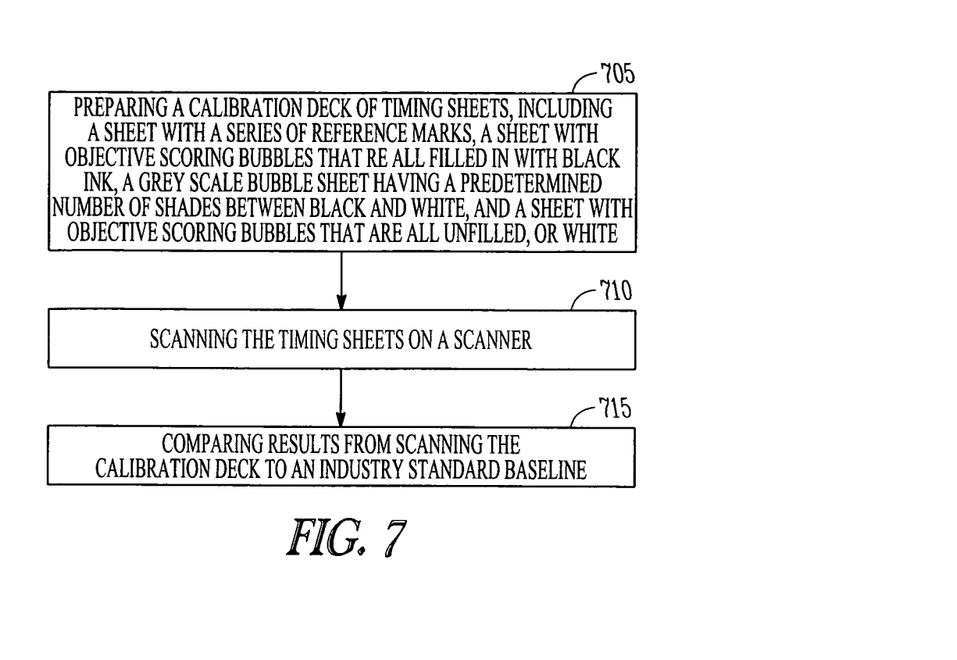
FIG. 7 illustrates a flow diagram of an embodiment of a method for calibrating imaging equipment.

FIG. 7 illustrates a flow diagram of an embodiment of a method for calibrating imaging equipment. According to one embodiments of a method, a calibration deck of timing sheets is prepared, at 705. The calibration deck includes a sheet with a series of reference marks that help determine the amount of skew, a sheet with objective scoring bubbles that are all filled in with black ink, a grey scale bubble sheet having a predetermined number of shades between black and white, and a sheet with objective scoring bubbles that are all unfilled, or white. The timing sheets are scanned on a scanner, at 710, and results from scanning the calibration deck are compared to an industry standard baseline, at 715.

According to various embodiments of the method, comparing results includes determining the amount of skew of an image on a sheet, determining the amount of stretch of an image on a sheet, measuring track speed of the scanner, and/or determining the proportionality of an image on a sheet. The method further includes automatically interpreting results using a threshold, in an embodiment. Interpreting the results includes proceeding if the score is acceptable within a predefined tolerance, and also includes providing a notification of an unacceptable result so that the scanner can be manually recalibrated, in various embodiments. In various method embodiments, a status bar is provided showing the relative completion of calibration deck comparison. In an embodiment, the relative completion is measured in percent. The method also includes determining the amount of one or more of shrinkage, stretch, skew or other distortions of a scanned page, in various embodiments.

Comparing results of the calibration deck scan to an industry standard baseline includes comparing the results to a scanner with a self-calibration feature, such as an NCS scanner, in an embodiment. The comparison establishes a darkness level, in various embodiments. According to various embodiments, each calibration deck can only be used a predetermined number of times. For example, each calibration deck can be scanned 10 times before it is replaced. An authorized user can adjust the number of uses per calibration deck, in an embodiment. Each scanner, or machine, is recalibrated on a predetermined schedule. In one embodiment, each scanner is recalibrated every 12 hours. The schedule for calibration of scanners can be adjusted by an authorized user, in various embodiments.

One aspect of the disclosure includes a system for calibrating a scanner. According to an embodiment, the system includes a calibration deck of sheets. The calibration deck includes, a sheet with a series of reference marks, a sheet with objective scoring bubbles that are all filled in with black ink, a grey scale bubble sheet having a predetermined number of shades between black and white, and a sheet with objective scoring bubbles that are all unfilled, or white. According to various embodiments, the calibration deck is adapted to be scanned on the scanner, and results from scanning the calibration deck are compared to an industry standard baseline. The system includes a display for depicting results for at least one scanner, in an embodiment.

The display includes a status bar showing the relative completion of calibration deck comparison scan, in an embodiment. The relative completion can be measured in percent. In various embodiments, the display includes a notification of an unacceptable result so that the scanner can be manually recalibrated. In one embodiment, at least sixteen grey scale bubble sheets are included having a predetermined number of shades between black and white. The grey scale bubble sheet has 256 shades, in an embodiment. At least 30 sheets with reference marks (such as a series of "T"'s, in an embodiment), at least two sheets with objective scoring bubbles that are all filled in with black ink, and at least two sheets with objective scoring bubbles that are all unfilled, or white are included in various embodiments.

A reference mark locator application and a reference mark viewer application work together with the calibration facilitator. These applications help identify image capture problems. They work together to capture a series of measurements on scanned images and display the measurements and any patterns found to the user of the applications.

The reference mark locator application uses specially printed documents having known printing specifications. These documents have 140 reference marks (or T-marks) printed in 14 rows and 10 columns. Each reference mark is printed at a precise distance from the other (0.75 inches, for example), both vertically and horizontally. After an image is captured of one of these documents on the scanner, it is fed into the locator application and all of the T-marks are programmatically located. The straight-line distance between each mark and its neighboring marks is calculated and output both as an annotation on the image, as well as into a text file. Using 0.75 inches as an example, all distances would be exactly 150 pixels on a perfect image (assuming 200 dots per inch (dpi)). In one embodiment, this application is used with a batch of 50 documents, scanned twice so images off both the top and bottom camera of IBML scanners are captured.

The reference mark viewer application is used to view the results of the batch of documents scanned using the reference mark locator. Once a batch is selected, the user can look at the measurement patterns on all of the images of the batch in rapid succession. The user can set color thresholds to make the viewing easier. For example, a user can set the application to identify all measurements of 149 pixels or less as green, all measurements of 151 pixels or more as red, and all measurements of exactly 150 pixels as white. Examining the results will show a pattern on multiple images where the measurements are consistently too big or too small, and the at-fault scanner can be identified and re-calibrated. It may be that the belt speeds are too fast, too slow, out of synch, or that the transition points between rollers on the scanner are flawed. The results may show something wrong from top to bottom or left to right over the entire image, or that specific rows or columns of measurements are consistently off in the image. The tolerance for errors depends upon the application the scanner is used for. For example, for certain scanner applications involving objective test answer sheets, measurements between 148 and 152 pixels are acceptable.

Another aspect of the present subject matter generally relates to methods and apparatus for verifying objective test result and survey images. A computer application for verifying and editing test responses where there is some question of the intended answer is referred to as quality control editing (or QC editing). Examples of situations in which there is some question of the intended answer include, but are not limited to: if more than one bubble scans as marked (i.e., it appears as if the student selected more than one answer), if no bubbles scan as marked (it appears as if the student selected no answers), or if erasures or marks exist which bring the result into question. In these situations, occurrences are selected where more than one editor is shown the response to determine if the machine correctly scored the response. If responses are the same, then they are accepted by the system. The system presents the editors with the response via an on-line system, eliminating the need for the editor to have the physical document. The system has built-in security, so if an individual edited the batch originally, they are locked out from being the QC editor (second pair of eyes) for that batch. This adds an extra level of control for document review. Also, the system allows for tracking the identification of which person or machine performed each step, or was responsible for each instance of scanning, scoring or editing. A time stamp and/or date stamp for each instance of scanning, scoring or editing is also generated and stored.

Figure 8:
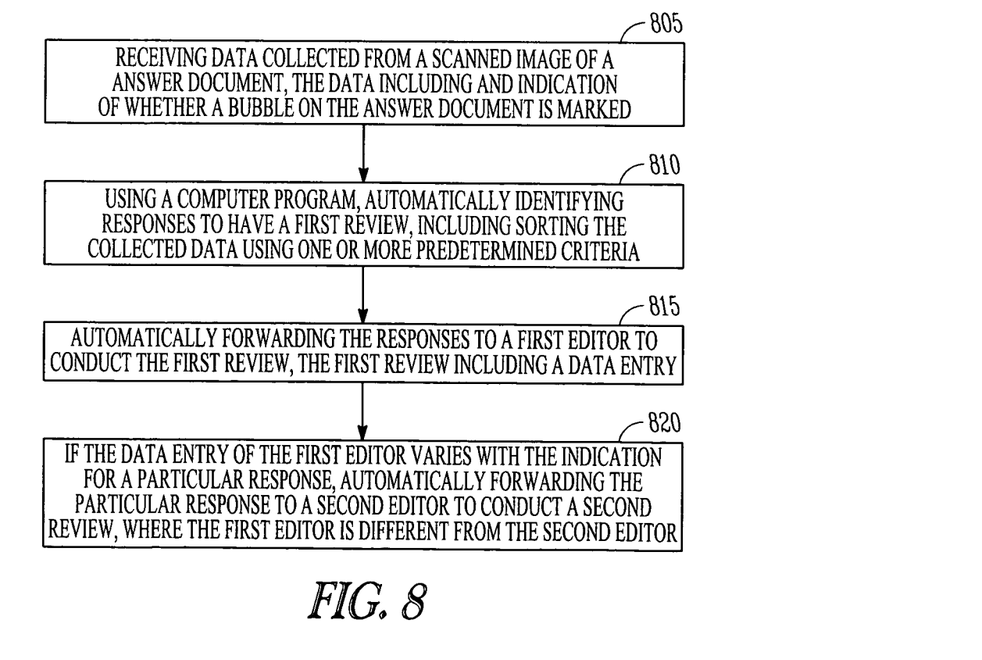
FIG. 8 illustrates a flow diagram of an embodiment of a method for verifying objective test result images.

FIG. 8 illustrates a flow diagram of an embodiment of a method for verifying objective test result images. According to one embodiment of the method, data collected from a scanned image of an answer document is received, at 805, the data including an indication of whether a bubble on the answer document is marked. Using a computer program, responses are automatically identified to have a first review, including sorting the collected data using one or more predetermined criteria, at 810. Automatically identifying the responses includes using a computer program to identify the responses, in various embodiments. The responses are automatically forwarded to a first editor to conduct the first review, the first review including a data entry, at 815. If the data entry of the first editor varies with the indication for a particular response, the particular response is automatically forwarded to a second editor to conduct a second review, at 820, where the first editor is different from the second editor. According to various embodiments, the data is tracked and access to the data is controlled to prevent a single editor from acting as both the first editor and the second editor. One example of controlling access includes providing individual, distinct passwords for each individual editor. Another example includes granting access based on authority level, where the first and second editors have different levels of authority. Identifying responses includes determining whether more than one bubble is filled for a single question, in an embodiment. In various embodiments, identifying responses includes determining whether no bubbles are filled for a single question. Identifying responses includes determining whether no initial scanner value can be determined for a single question, and/or determining whether erasures or marks exist that bring into question whether a bubble is filled, in various embodiments. Tracking the data includes applying a time and/or date stamp for each instance of editing, scanning and/or scoring the data, in various embodiments. In an embodiment, if reference marks cannot be location on an answer document, the entire document is forwarded for a first review.

Demographic fields of an answer document include fields where the respondent provides information about their name, age, address, grade level and subject, for example. In demographic fields, it is common for more than one bubble to be filled in (where a name is more then one letter, for example). In the case of demographic fields, it is necessary to search for omitted bubbles (or "omits"). Examples of omitted bubbles include leading bubbles, trailing bubbles and embedded bubbles. Leading bubble omits include omitted bubbles at the beginning of a series of filled bubbles. Trailing bubble omits include omitted bubbles at the end of a series of filled bubbles. Embedded bubble omits include omitted bubbles within a series of filled bubbles.

The quality control editing process is automated and provides a blind edit to the second editor, in an embodiment. The first editor is presented with the bubbles and the value given by the scanner, and the second editor is also presented with the bubbles and the value given by the scanner, but not the value given by the first editor, in an embodiment. According to various embodiments, three manual settings exist for quality control editing rules. The second edit is required: 1) always if field flagged for an initial edit; 2) never; or 3) only if the initial edit made a change (default setting). The system forces the initial edit, and will not advance through processing until completed.

Figure 4:
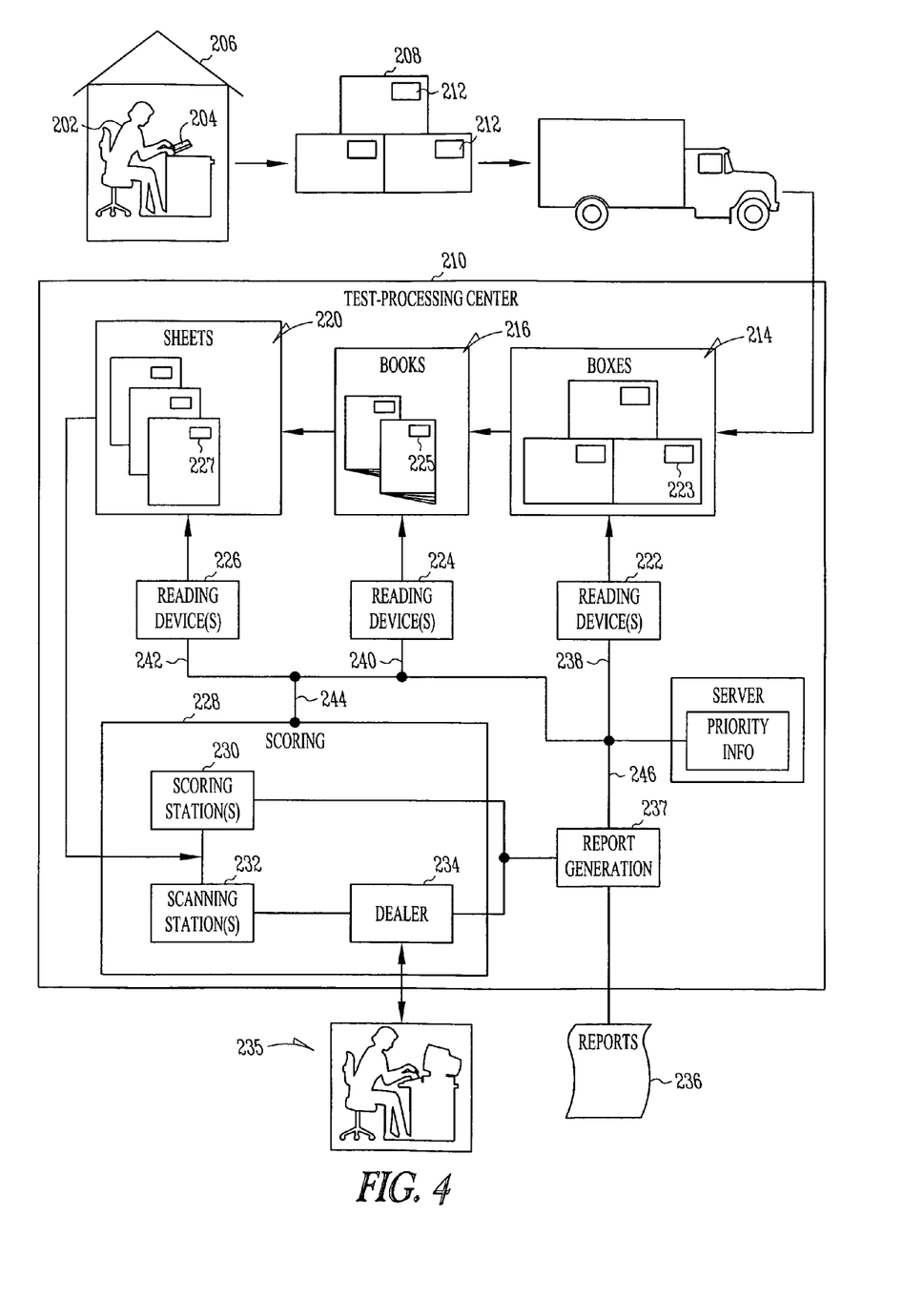
FIG. 4 illustrates a block diagram of an embodiment of an apparatus for processing and scanning documents.

FIG. 4 illustrates a block diagram of an embodiment of an apparatus for processing and scanning documents. The system resides outside the scanning system, and is a setup application used to tell the scanning system how to scan pages of a completed test. In the illustrated embodiment, a test-taker (e.g., a student) 202 completes a standardized test 204 at a test-taking center (e.g., a school) 206. In this embodiment, the standardized tests include test booklets. Each test booklet includes a number of pages that contain a number of test items or questions.

Completed test booklets are boxed, illustrated at 208, for shipping to a test-processing center 210. The boxes include an identifier 212, such as a bar code for example. Upon arriving at the test-processing center 210, the boxes of test booklets are unloaded at 214. The test booklets are removed from the boxes and sorted at 216. At 220, the test booklets are cut into loose pages. These loose pages are reconciled to ensure that all of the pages for each test booklet are accounted for. Reading devices 222, 224, and 226, such as bar code scanners for example, are used to read the identifiers 223 and identify the boxes, read the identifiers 225 and identify the test booklets, and read the identifiers and identify the pages. In one embodiment, the image field definition system identifies the identifying markings for the pages.

The test pages are graded or scored at 228. In one embodiment, objective scoring tasks, such as multiple choice questions for example, are scored using scoring of tests from images 230. In one embodiment, open-ended scoring tasks are scanned at scanning stations 232, are stored in a queue, and are distributed by a dealer 234 to human readers 235 who evaluate the open-ended scoring tasks. Reports 236 of the score results are provided at 237.

A server in the test-processing center is used to perform a variety of tasks with the scanned data, as discussed herein. In one embodiment, the server includes priority information, as illustrated via lines 238, 240, 242, 244 and 246; the priority information is available at various places along the process. In one embodiment, for example, the reading device(s) 222 determines which of the boxes should proceed for further processing before other boxes. In one embodiment, the reading device(s) 224 determine which of the test booklets should proceed for further processing before other test booklets. In one embodiment, the reading device(s) 226 determine which of the pages (or test items on the pages) should proceed for further processing before other pages (or test items on the pages). In one embodiment, for example, the priority information is used in the scoring system 228 to determine which test items should be scored before other test items. In one embodiment, for example, the priority information is used to determine which reports should be provided before other reports 236.

Specific embodiments have been illustrated and described herein, however, it is to be understood that the above description is intended to be illustrative, and not restrictive. The scope of the present subject matter should be determined with reference to the appended claims, along with the full scope of legal equivalents to which such claims are entitled.

I claim:

1. A method, comprising:
   receiving educational assessments from a project in a paper format; and
   processing educational assessments from the paper format to an electronic format using an application, wherein processing includes:
      providing a navigation console adapted to provide a portal to a user and further adapted to provide a login interface to the user;
      scanning educational assessment documents and generating images;
      passing images through applications to derive data from the images, the applications including: a scan facilitator application, an image quality application, a scan quality application, a scan quality exporter application, an image mark recognition scoring engine application, a barcode edit application, an editing application, an editing quality control application, a validate application, and an instance build application; and
      transferring data to peripheral systems,
      wherein more than one project can be run simultaneously on the application and more than one instance of the application can be run at a time.

2. The method of claim 1, wherein processing education assessments further includes providing support applications for managing the processing.

3. The method of claim 2, wherein providing support applications includes providing a project setup application, an image field definition application, a calibration facilitator application, and a priority manager application.

4. The method of claim 1, wherein receiving education assessments includes receiving standardized test answer sheets.

5. The method of claim 1, wherein receiving education assessments includes receiving survey response forms.

6. The method of claim 1, wherein passing images through the validate application includes validating data associated with the image.

7. The method of claim 6, wherein passing images through applications includes using a batch reset application if data fails to validate.

8. The method of claim 1, wherein passing images through applications includes using an image insertion application.

9. The method of claim 1, wherein passing images through applications includes using a service manager application.

10. The method of claim 2, wherein providing support applications includes providing a tracking tool application.

11. The method of claim 2, wherein providing support applications includes providing at least one support application for exception handling.

12. The method of claim 2, wherein providing support applications includes providing a typed response application.

13. The method of claim 1, wherein scanning documents includes scanning using an electronic scanner.

14. The method of claim 2, wherein providing support applications includes providing an extract files application.

15. The method of claim 1, further comprising storing the images in a database.

16. The method of claim 13, wherein scanning using an electronic scanner includes scanning using an IBML scanner.

17. The method of claim 8, wherein using an image insertion application includes identifying pages of the educational assessment documents that cannot be scanned.

18. The method of claim 8, wherein using an image insertion application includes identifying pages of the educational assessment documents that are improperly scanned.

19. The method of claim 17, wherein the identified pages are flagged for manual re-scanning.

20. The method of claim 18, wherein the identified pages are flagged for manual re-scanning.

* * * * *